UNITED STATES PATENT OFFICE.

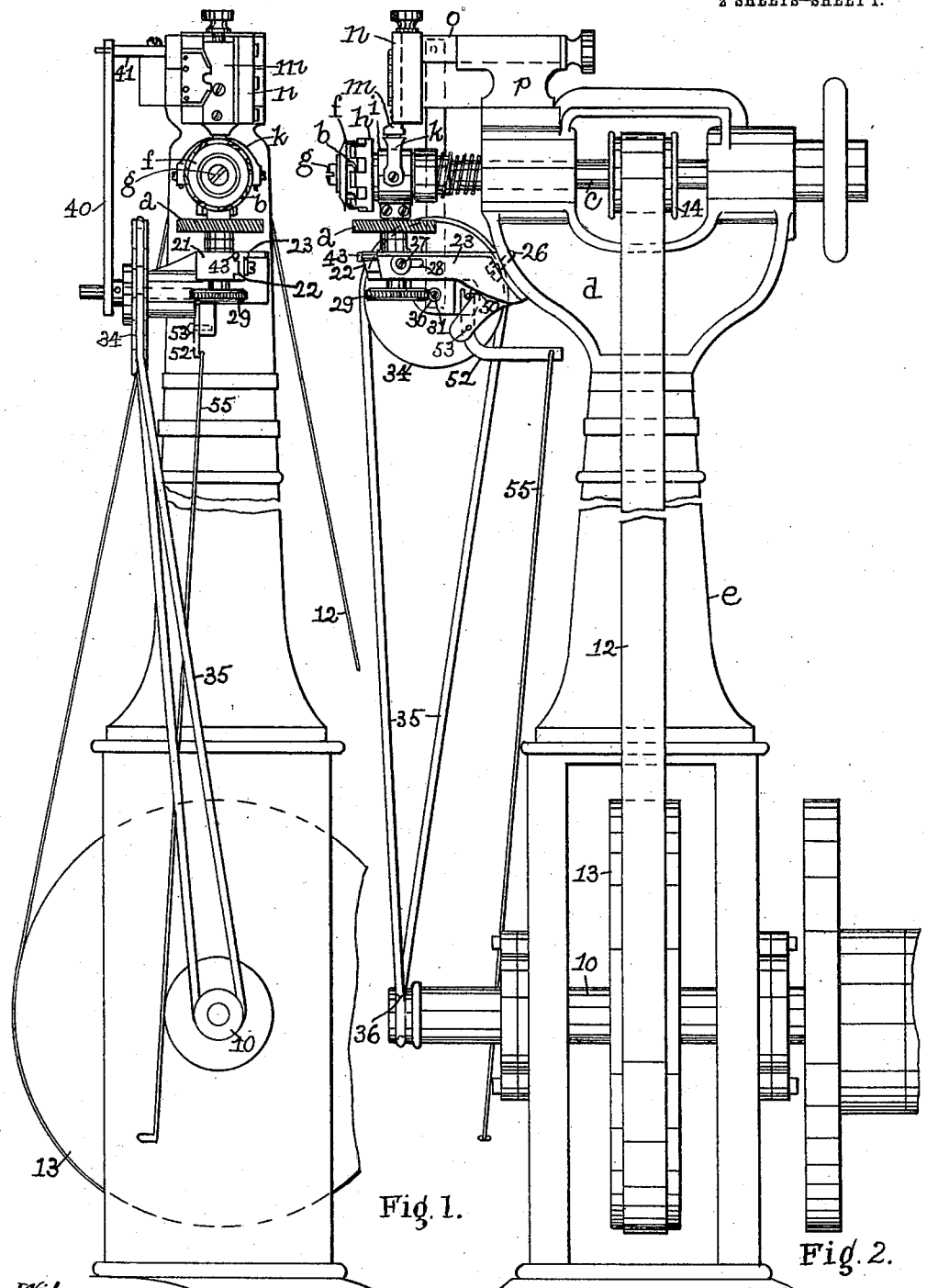

AMBROSE S. VOSE, OF BROOKLINE, MASSACHUSETTS, ASSIGNOR, BY MESNE ASSIGNMENTS, TO ARTHUR F. GRAY AND JAMES M. HALL, TRUSTEES, OF CAMBRIDGE, MASSACHUSETTS.

EDGE-TRIMMING MACHINE.

987,656.        Specification of Letters Patent.      Patented Mar. 21, 1911.

Application filed June 3, 1909. Serial No. 499,895.

*To all whom it may concern:*

Be it known that I, AMBROSE S. VOSE, a citizen of the United States, residing in Brookline, county of Norfolk, and State of Massachusetts, have invented an Improvement in Edge-Trimming Machines, of which the following description, in connection with the accompanying drawings, is a specification, like letters on the drawings representing like parts.

This invention relates to machines employing a rotary cutter for trimming the edges of the soles of boots and shoes, and has for its object to provide machines of the class referred to with a feeding device for the sole, preferably a rotary feed wheel, which is arranged to rotate in a plane substantially at right angles to the plane in which the rotary cutter is rotated. The rotary feed wheel serves as a bearing for the tread portion of the sole and effects a positive feed of the sole with relation to the rotary cutter, and also serves as a support on which the operator can tilt the sole, so as to present the edge of the sole to the rotary cutter in such manner as to obtain a smooth and uniform trimming of the edge of the sole and avoid irregularities in the same due to the operator holding the edge of the sole up to the rapidly rotating cutter with a varying or irregular hand pressure. Provision is made for rotating the feed wheel at a materially slower speed than that of the rotary cutter, and also for adjusting the feed wheel with relation to the rotary cutter so as to compensate for soles of different thickness. Provision is also made for obtaining different rates of feed for the soles. These and other features of this invention will be pointed out in the claims at the end of this specification.

Figure 3:
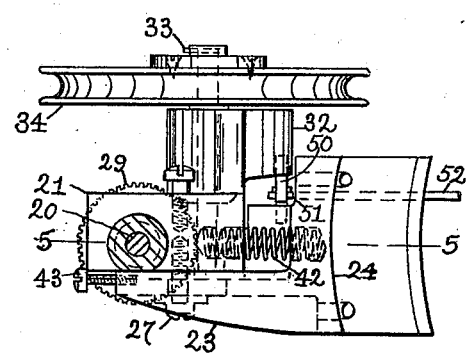
Figure 4:
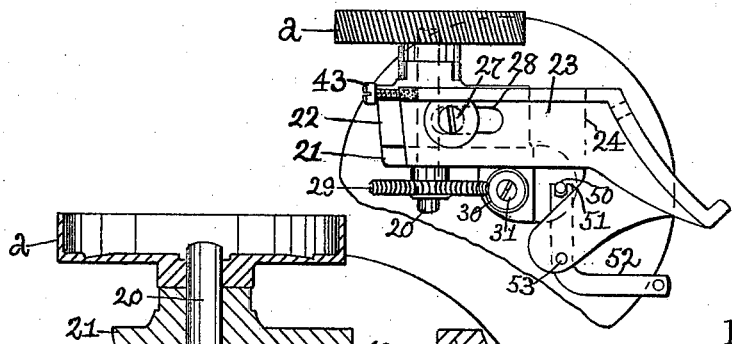
Figure 5:
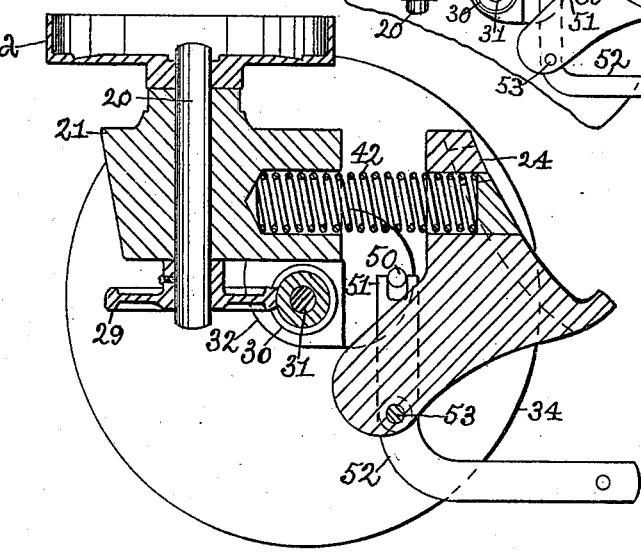

Figure 1 is a front elevation of an edge trimming machine embodying this invention. Fig. 2, a side elevation of the machine shown in Fig. 1. Fig. 3, a detail in plan to be referred to. Fig. 4, an elevation of the parts shown in Fig. 3, and Fig. 5, an enlarged sectional detail, the section being taken on the line 5—5, Fig. 3.

Referring to the drawing, *a* represents a rotary feed wheel, which is applied to a sole edge trimming machine, which may be such as shown and described in U. S. Patent No. 858,494 granted July 2, 1907 to Albert E. Ayer and myself, and which comprises essentially a rotary cutter *b* fast on a shaft *c* mounted in the head *d* of a supporting standard or frame *e*, the said cutter having coöperating with it a guard or shield *f*, which is fastened to the shaft *c* by the screw *g*, and a bed *h* for the edge of the sole to rest against, which bed coöperates with the rotary cutter *b* and is supported in a bearing sleeve *i*, which is radially movable with relation to the shaft *c* by the yoke *k* attached to the slide block *m*, movable in a vertical arm *n* attached to a side bar *o*, which is movable horizontally in guideways in a block *p* attached to the head *d* of the machine. The shaft *c* is driven from a main shaft 10 by a belt 12 passed about the pulleys 13, 14, on said shafts.

The feed wheel *a* is mounted to revolve in a horizontal plane and substantially at right angles to the plane of rotation of the cutter *b*, and is fast on a shaft 20 (see Fig. 5) extended down through a sliding carrier or block 21 provided on one side with a rib 22 which slides in a guideway on the inner face of an arm 23 projecting from a block or piece 24, which is curved at its rear end to conform to the shape of the head *d* to which it is detachably secured as by bolts or screws 26. The carrier 21 for the feed wheel is secured to the arm 23 to slide thereon by the bolt or screw 27 extended through a slot 28 in the said arm, (see Fig. 4). The feed wheel shaft 20 has secured to it below the slide block or carrier 21, a worm gear 29, which meshes with a worm 30 on a shaft 31 extended through and supported by a bearing hub 32 attached to or forming part of the said carrier, and having detachably secured on it as by the pin 33 a pulley 34, which is connected by a belt 35 with the main shaft 10 having an annular groove 36, which practically forms a small pulley on said shaft. The worm shaft 31 may be also supported by a hanger arm 40 pivoted to an arm 41 attached to the block *p*.

The feed wheel carrier 21 is acted upon by a spring 42 to normally project the feed wheel into what may be considered its extreme forward position, and against an adjustable stop 43, shown as a screw which enters a threaded socket in the arm 23 and has its head projected into the path of the carrier 21 to be engaged by the latter. Provision is made for moving the feed wheel carrier in the opposite direction, and for this purpose, the bearing block or piece 32 for the worm shaft 31 is provided with a pin 50, which is engaged by fingers 51 on one arm of an elbow lever 52 pivoted at 53 to the supporting piece or block 24 and having its other end joined by a link or rod 55 to a foot treadle (not shown).

The feed wheel *a* may have its periphery milled, serrated or otherwise roughened. In operation, the feed wheel *a* is normally positioned with its periphery tangential or substantially so to the plane of rotation to the outer edge of the knives of the rotary cutter *b*, so that, when the shoe to be trimmed has the edge of its sole presented to the rotary cutter, the tread portion of the outer sole bears against the edge of the feed wheel, with the result, that the latter in its rotation feeds the sole forward, and at the same time affords a bearing for steadying the shoe, which bearing is in the nature of a pivot, as the sole of the shoe is tangential to the wheel, whereby a superior trimming of the edge of the sole may be effected by the operator, whose hands are required only to turn the sole on the tangent point of the wheel as a pivot, thereby enabling the operator to more sensitively present the edge of the sole to the rotary cutter and obtain a smoother, more uniform and finished trimmed edge on the sole, which edge is presented to the operator so as to be seen by him during the trimming operation. When a thicker sole is to be trimmed, the feed wheel carrier may be moved by the operator depressing the foot treadle (not shown) to which the link or rod 55 is connected, so as to turn the lever 52 which engages the pin 50 and causes the feed wheel carrier 21 to slide back away from the plane of rotation of the rotary cutter, and allow the thicker sole to be presented to the cutter, and when thus presented the pressure upon the foot treadle referred to, is removed, and the spring 42 forces the carrier against the front stop 43, which is adjusted to position the feed wheel to the rotary cutter with reference to properly trimming the thicker soles. If desired, the feed wheel may be moved back sufficiently far to enable the sole to be trimmed by hand alone.

The feed wheel *a* is driven from the main shaft 10 of the machine, which is rotated at a substantially high speed, and provision is made for reducing the speed so that the feed wheel is rotated at a comparatively slow speed, and this result is obtained by belting from the main shaft to the large pulley 34 on the worm shaft 31 and by means of the worm 30 and worm gear 29. The pulley 34 is removably attached to the worm shaft, so that pulleys of different sizes may be used to obtain different rates of feed for the shoe.

I have herein shown the rotary feeding device as a wheel having a milled, serrated or roughened surface, but it is not desired to limit the invention in this respect. So also, I have shown the rotary feed wheel as used on one construction of edge trimming machine employing a rotary cutter, but it is not desired to limit the invention to the particular construction of edge trimming machine herein shown.

Claims:

1. A sole edge trimming machine comprising a rotary cutter having a substantially horizontal axis of rotation, a feeding device arranged to bear on the tread face of a sole whose edge is presented upward to the cutter to enable the operator to watch the progress of the work, means for moving said device to impart a feed movement to the sole, and means whereby the device may be wholly removed from the plane of travel of the tread face of the sole, whereby the sole may be fed by the feed device or by hand.

2. A sole edge trimming machine comprising a rotary cutter having a substantially horizontal axis of rotation, a feeding device arranged to bear on the tread face of a sole whose edge is presented upward to the cutter to enable the operator to watch the progress of the work, said feeding device being adapted to yieldingly support the sole, means for moving said device to impart a feed movement to the sole, and means for retracting the feeding device out of the plane of travel of the tread face of the sole, whereby the sole may be fed by the feed device or by hand.

3. A sole edge trimming machine comprising a rotary cutter having a substantially horizontal axis of rotation, a rotary feed wheel arranged to bear on the tread face of a sole presented edge upward to the cutter to enable the operator to watch the progress of the work, a movable carrier having bearings for the shaft of the feed wheel, mechanism for rotating the feed wheel shaft under different adjustments of the carrier, means for yieldingly holding the carrier in a projected position, and means controlled by the operator for retracting the carrier out of the plane of travel of the tread face of the sole, whereby the sole may be fed by the feed wheel or by hand.

4. In a machine of the character described, in combination, a rotary cutter, a rotatable shaft upon which said cutter is mounted to rotate therewith, a main shaft, means for connecting the cutter shaft with said main shaft, a rotatable feed wheel arranged to rotate in a plane substantially at right angles to said cutter shaft, a shaft upon which said feed wheel is mounted, a worm gear on said feed wheel shaft, a carrier for said feed wheel shaft, a worm shaft journaled in said carrier and provided with a worm engaging said worm gear, and means for connecting said worm shaft with said main shaft to be driven therefrom, substantially as described.

5. In a machine of the character described, in combination, a rotary cutter, a rotatable shaft upon which said cutter is mounted to rotate therewith, a rotatable feed wheel arranged to rotate in a plane substantially at right angles to said cutter shaft, a shaft upon which said feed wheel is mounted, a carrier for said feed wheel shaft bodily movable toward and from the plane of rotation of said rotary cutter, and gearing carried by said carrier for rotating said feed wheel substantially as described.

6. In a machine of the character described, in combination, a rotary cutter, a rotatable shaft upon which said cutter is mounted to rotate therewith, a rotatable feed wheel arranged to rotate in a plane substantially at right angles to said cutter shaft, a shaft upon which said feed wheel is mounted, a carrier for said feed wheel shaft bodily movable toward and from the plane of rotation of said rotary cutter, gearing carried by said carrier for rotating said feed wheel, a main shaft, and means connecting said gearing with said main shaft, said means having provision for enabling the rotation of the feed wheel to be varied, substantially as described.

7. In a machine of the character described, a rotary cutter, a rotatable shaft on which said cutter is mounted to rotate therewith, a rotatable feed wheel arranged to rotate in a plane substantially at right angles to the said rotary cutter, a carrier for said feed wheel, a support on which said carrier is slidably mounted, an adjustable stop carried by said support and coöperating with said carrier to limit its movement toward the plane of rotation of said cutter, a spring to normally hold said carrier against said stop, means to effect bodily movement of said carrier away from said stop and against the action of said spring, and means to effect rotation of said feed wheel, substantially as described.

In testimony whereof, I have signed my name to this specification in the presence of two subscribing witnesses.

AMBROSE S. VOSE.

Witnesses:
P. W. PEZZETTI,
JAS. H. CHURCHILL.

---

Copies of this patent may be obtained for five cents each, by addressing the "Commissioner of Patents, Washington, D. C."